United States Patent
Yoon

(10) Patent No.: US 6,934,110 B2
(45) Date of Patent: Aug. 23, 2005

(54) APPARATUS TO GENERATE AN ADAPTIVE TRACK ZERO CROSSING SIGNAL IN A DISC DRIVE AND METHOD USED BY THE APPARATUS

(75) Inventor: Hyeong-deok Yoon, Gyeonggi-do (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 309 days.

(21) Appl. No.: 10/245,386

(22) Filed: Sep. 18, 2002

(65) Prior Publication Data
US 2003/0063410 A1 Apr. 3, 2003

(30) Foreign Application Priority Data
Sep. 29, 2001 (KR) .................................. 2001-61034

(51) Int. Cl.[7] ............................................ G11B 21/02
(52) U.S. Cl. ..................................................... 360/75
(58) Field of Search ............................ 360/75, 78.04, 360/78.09; 369/44.28, 44.29

(56) References Cited

U.S. PATENT DOCUMENTS 5,289,447 A * 2/1994 Kobayashi et al. ...... 369/44.28
5,327,408 A * 7/1994 Belser ...................... 369/44.26
5,768,229 A * 6/1998 Ikeda ....................... 369/44.28
5,970,032 A * 10/1999 Ikeda et al. .............. 369/44.29

* cited by examiner

Primary Examiner—David Hudspeth
Assistant Examiner—K. Wong
(74) Attorney, Agent, or Firm—Stein, McEwen & Bui, LLP

(57) ABSTRACT

An apparatus and method generate an adaptive track zero crossing signal in a disc drive. An adder adds and outputs a predetermined signal to generate a track zero crossing signal and a correction signal. A comparator having a first input node and a second input node, receives the predetermined signal from the adder through the first input node, receives a reference voltage signal through the second input node, compares the signals input into the first and second input nodes, and generates a track zero crossing signal having a square wave. An offset correction calculator measures lengths of high and low sections of the track zero crossing signal, calculates a ratio of differences in the lengths between the high and low sections, and generates a correction signal to maintain a duty ratio of the track zero crossing signal at a predetermined target value using the calculated ratio.

19 Claims, 7 Drawing Sheets

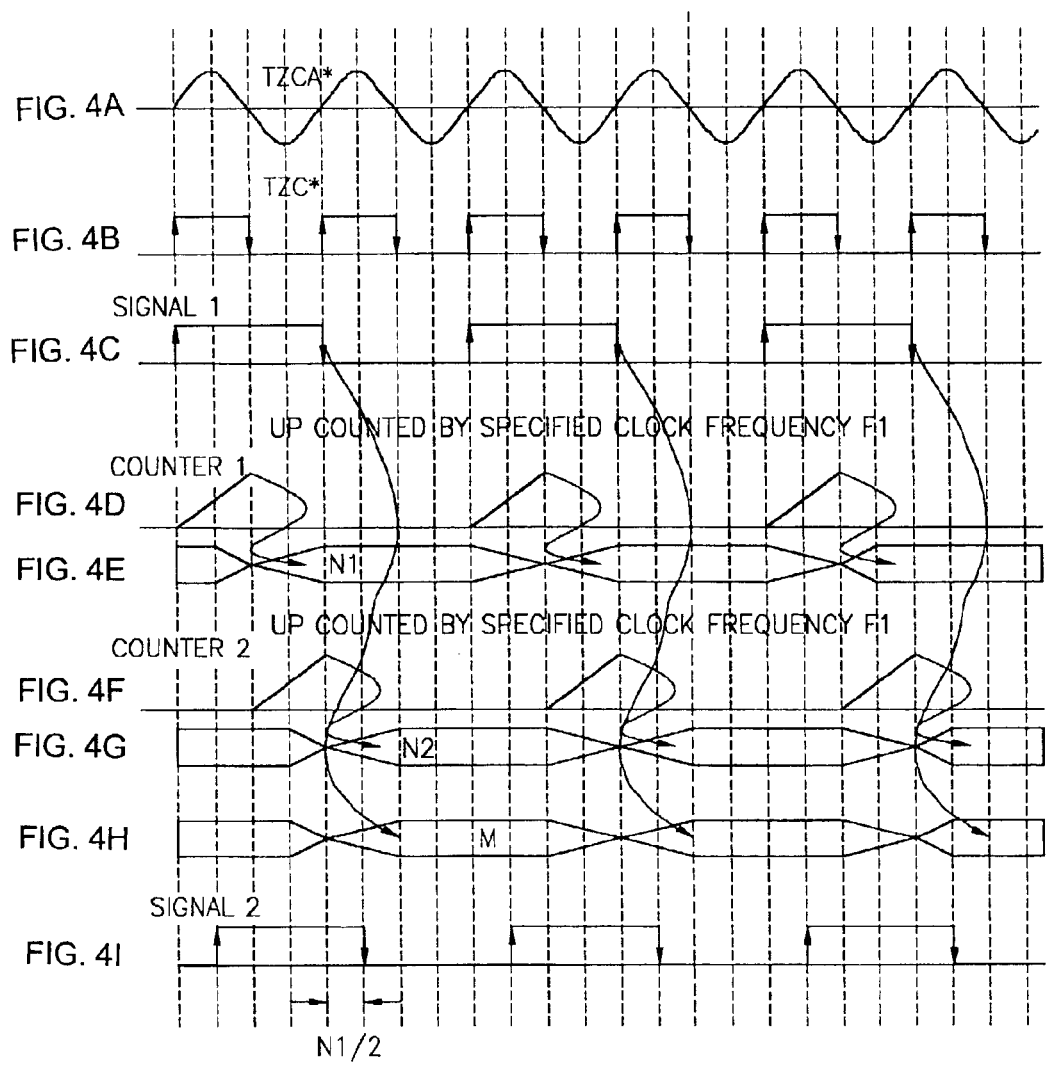

TZCA* SIGNAL

TZCA SIGNAL

APPARATUS TO GENERATE AN ADAPTIVE TRACK ZERO CROSSING SIGNAL IN A DISC DRIVE AND METHOD USED BY THE APPARATUS

CROSS REFERENCE TO RELATED APPLICATIONS

This application claims the benefit of Korean Application No. 2001-61034 filed Sep. 29, 2001, in the Korean Industrial Property Office, the disclosure of which is incorporated herein by reference.

BACKGROUND OF THE INVENTION

1. Field of the Invention

The present invention relates to a disc drive servo control apparatus and a method used by the apparatus, and more particularly, to an apparatus to generate an accurate adaptive track zero crossing signal in a disc drive through correction of an offset and unbalance due to a duty correction, although a tracking error signal of the disc drive is offset or unbalanced, and a method used by the apparatus.

2. Description of the Related Art

In general, a transfer speed and position information of a transducer included in a pickup of a disc drive, are estimated using a track zero crossing signal. Thus, if the track zero crossing signal is unstable, the transfer speed and the position information of the transducer cannot be accurately estimated. As a result, a precise seek control cannot be performed.

A general track zero crossing signal generator includes a comparator as shown in FIG. 1. In detail, the tracking error signal (TZCA), which is detected from a pickup and output from an RF amplifier, is applied to a first input node of the comparator, and a reference voltage VREF from a system is applied to a second input node.

However, when an optical spot is transferred at high speed in a direct seek control (unclear), the tracking error signal (TZCA) can be offset or unbalanced due to several reasons such as crossing of optical axes, mechanical friction of a transfer system, noise of the RF amplifier, and slow response of a transfer control system, or impacts. The track zero crossing signal output from the comparator may temporarily be absent in some sections because of the offset or unbalance of the tracking error signal (TZCA). In this case, information on the position and the transfer speed is inaccurate, and thus, malfunction occurs in a seek servo.

SUMMARY OF THE INVENTION

Various objects and advantages of the invention will be set forth in part in the description that follows and, in part, will be obvious from the description, or may be learned by practice of the invention.

To solve the above-described problems, it is an object of the present invention to provide an apparatus for generating an accurate adaptive track zero crossing signal in a disc drive by automatic correction of offset and unbalance, even if a tracking error signal that is used for generation of the track zero crossing signal is offset or unbalanced due to several causes, and a method used by the apparatus.

To achieve the above and other objects, the present invention provides an apparatus generating an adaptive track zero crossing signal in a disc drive. The apparatus includes an adder, a comparator, and an offset correction calculator.

An adder adds and outputs a predetermined signal to generate a track zero crossing signal and a correction signal. The comparator has a first input node and a second input node, receives the predetermined signal from the adder through the first input node, receives a reference voltage signal through the second input node, compares the signals input into the first and second input nodes, and generates a track zero crossing signal having a square wave. An offset correction calculator measures lengths of high and low sections of the track zero crossing signal, calculates a ratio of differences in the lengths between the high and low sections, and generates a correction signal to maintain a duty ratio of the track zero crossing signal at a predetermined target value using the calculated ratio.

To achieve the above object and other objects, according to a second embodiment of the present invention, there is provided an apparatus to generate an adaptive track zero crossing signal in a disc drive. The apparatus includes a comparator, a subtractor, and an offset correction calculator. The subtractor subtracts a correction signal from a reference voltage signal to process and output a signal. The comparator has a first input node and a second input node, receives a predetermined signal to generate the track zero crossing signal through the first input node, receives the signal output from the subtractor through the second input node, compares the signals input through the first and second input nodes, and generates the track zero crossing signal having a square wave. The offset correction calculator measures lengths of high and low sections of the track zero crossing signal from the comparator, calculates a ratio of differences in the lengths between the high and low sections, and generates a correction signal to maintain a duty ratio of the track zero crossing signal at a predetermined target value using the calculated ratio.

To achieve the above object and other objects, there is provided a method of generating an adaptive track zero crossing signal in a disc drive. Lengths of high and low sections are measured in each cycle of the track zero crossing signal. A predetermined difference ratio in the lengths measured between the high and low sections is calculated. A correction signal to maintain a duty ratio of the track zero crossing signal at a predetermined target value is generated using the predetermined difference ratio. The correction signal is applied to a track zero crossing signal generator to correct an offset.

These together with other objects and advantages, which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

The above objective and advantage of the present invention will become more apparent by describing in detail preferred embodiments thereof with reference to the attached drawings in which:

FIGS. 4A through 4I are views of waveforms of main signals applied to the apparatuses of FIGS. 2 and 3;

DETAILED DESCRIPTION OF THE PREFERRED EMBODIMENTS

Hereinafter, embodiments of the present invention will be described in detail with reference to the attached drawings. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

Figure 1:
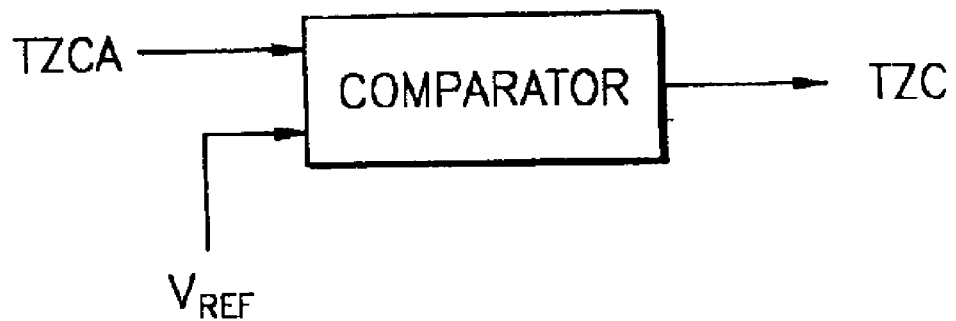
FIG. 1 is a block diagram of a general apparatus to generate a track zero crossing signal.
Figure 2:
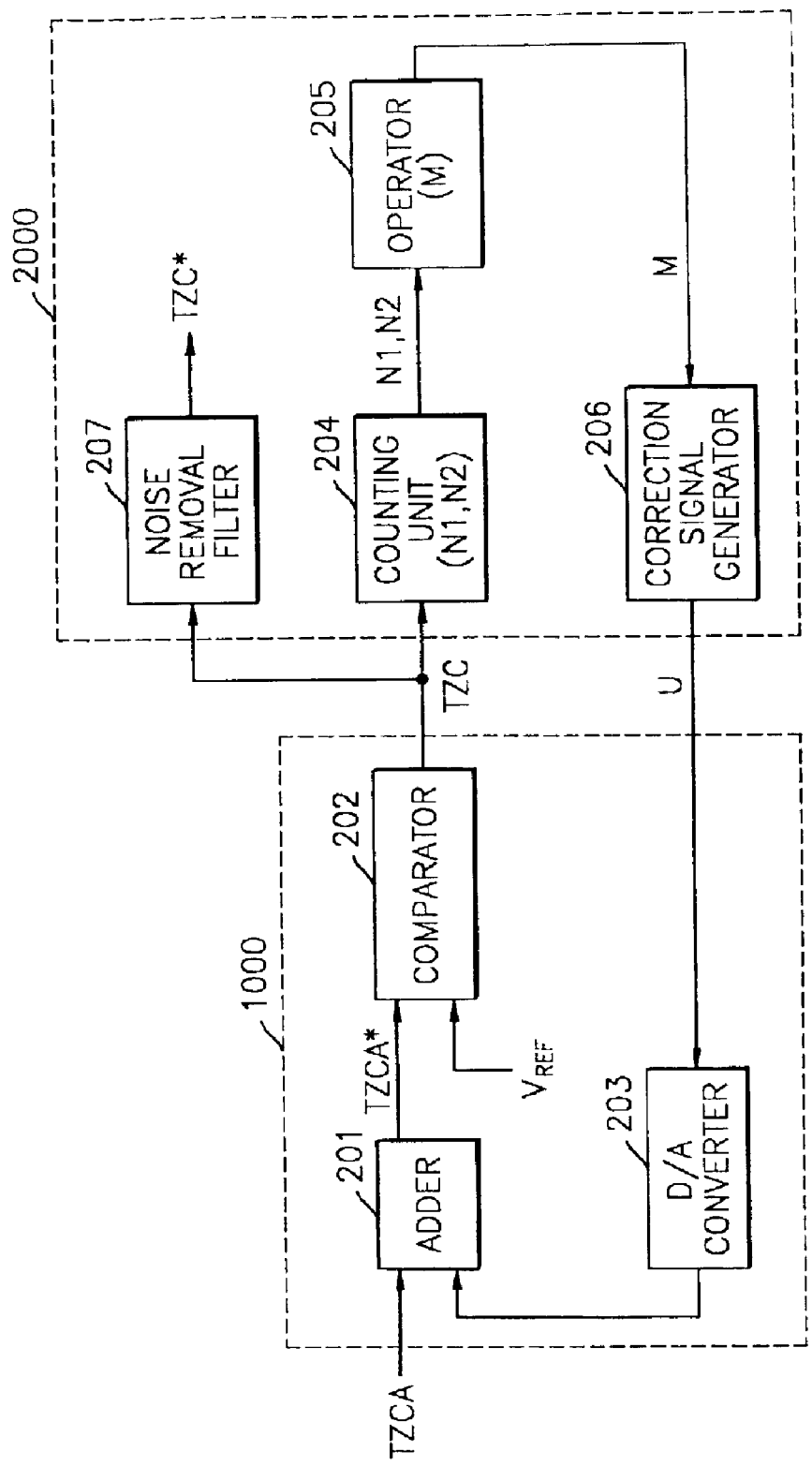
FIG. 2 is a block diagram of an apparatus to generate an adaptive track zero crossing signal according to a first embodiment of the present invention.

As shown in FIG. 2, an apparatus to generate an adaptive track zero crossing signal in a disc drive, according to a first embodiment of the present invention, includes an adder 201, a comparator 202, a digital-to-analog (D/A) converter (DAC) 203, a counting unit 204, an operator 205, a correction signal generator 206, and a noise removal filter 207.

The adder 201, the comparator 202 and the D/A converter 203 form an analog signal processor 1000, and the counting unit 204, the operator 205, the correction signal generator 206 and the noise removal filter 207 form a digital signal processor 2000.

A circuit including the counting unit 204, the operator 205, the correction signal generator 206, and the D/A converter 203 is called an offset correction operator.

The comparator 202 may include an operational amplifier or the like, and receives as input signals a reference voltage VREF to an inverse input node (a first input node) and a signal, (TZCA*) to be discussed with regards to FIG. 4A, to a non-inverse input node (a second input node). The signal TZCA* is generated by adding a correction signal U to correct an offset and unbalance, which is output from the D/A converter 203, to a tracking error signal TZCA in the adder 201. The comparator 202 compares the input signals from the first and second input nodes. Here, if the input signal of the second input node is greater than the reference voltage VREF, the input signal of the second input node is considered to be logic "high." If not, the input signal of the second input node is considered to be logic "low." In other words, the comparator 202 outputs a track zero crossing signal TZC having a square wave.

A method of detecting and correcting an offset of the track zero crossing signal TZC will now be described.

Supposing that the tracking error signal TZCA used to generate the track zero crossing signal TZC is $y1=A*\sin \omega t$ and the offset is $y2=dc$, a time t1 of a high section and a time t2 of a low section of the track zero crossing signal TZC are represented by formulas 1 and 2, respectively:

$$t1 = \pi/\omega - 2/\omega * \sin^{-1}(dc/A) \quad (1)$$

$$t2 = \pi/\omega + 2/\omega * \sin^{-1}(dc/A) \quad (2)$$

A difference between t1 and t2 with respect to a cycle (t1+t2) of the tracking error signal TZCA, i.e., (t2−t1)/(t2+t1), is obtained from formulas 3, 4, and 5:

$$t1 - t2 = 4/\omega \sin^{-1}(dc/A) \quad (3)$$

$$t1 + t2 = 2 * \pi/\omega \quad (4)$$

$$(t1-t2)/(t1+t2) = 2/\pi * \sin^{-1}(dc/A) \quad (5)$$

To obtain the times t1 and t2 from formulas 1 and 2, a clock having a predetermined frequency is applied to an up-counting unit including the counting unit 204 to measure the times t1 and t2 of high and low sections of the track zero crossing signal TZC having a square wave output from the comparator 202. In other words, supposing that a frequency of a clock is fc, clock cycles of t1/fc and t2/fc are counted for the times t1 and t2, respectively. Counted values N1 and N2 of the counting unit 204 are represented by formulas 6 and 7:

$$N1 = t1/f_c \quad (6)$$

$$N2 = t2/f_c \quad (7)$$

Thus, substituting formulas 6 and 7 into formula 5 we obtain formula 8:

$$(t1-t2)/(t1+t2) = (N1-N2)/(N1+N2) \quad (8)$$

where, supposing that a ratio M=(N1−N2)/(N1+N2), formula 5 can be represented as formula 9:

$$M = 2/\pi * \sin^{-1}(dc/A) \quad (9)$$

By rearranging formula, 9 a DC offset (dc) can be found as shown in formula 10:

$$dc = A * \sin(M/2\pi) \quad (10)$$

Thus, after the ratio M is obtained and an amplitude A of the tracking error signal TZCA is measured, the DC offset (dc) can be calculated.

A method of obtaining the ratio M will now be described in detail.

The counting unit 204 includes counters 1 and 2 (not shown) and registers 1 and 2 (not shown), and measures the counted values N1 and N2 of the counting unit 204. First, the counting unit 204 generates a signal 1 by dividing a frequency of the track zero crossing signal TZC having a square wave into two frequencies, as shown in FIG. 4C. As shown in FIGS. 4D and 4E, a counter 1 counts a clock signal during the high section of the track zero crossing signal TZC when the signal 1 is logic "high." The register 1 latches a counted clock signal value by the counter 1. As shown in FIGS. 4F and 4G, a counter 2 counts the clock signal during the low section of the track zero crossing signal TZC when the signal 1 is logic "high." The register 2 latches a counted value of the check signal by the counter 2. N1 and N2, which are latched to registers 1 and 2 at a falling edge of the signal 1, are applied to the operator 205.

The operator 205 calculates the ratio M using the counted values N1 and N2. In other words, for several system clock cycles the ratio, the ratio M is obtained by calculating (N1−N2)/(N1+N2). An inner register 3 (not shown) in the operator 205 latches the ratio M, as shown in FIG. 4H. The operator 205 transmits an interrupt signal to the correction signal generator 206 at a falling edge of a signal 2. Here, the signal 2, as shown in FIG. 4I, is generated by delaying the signal 1 by N1/2. The signal 2 is used to prevent a miscounting of the counters 1 and 2 when the digital correction signal U is converted into an analog correction signal.

As a result, the correction signal generator 206 calculates the digital correction signal U and outputs the digital correction signal U to the D/A converter 203. An algorithm used to calculate the digital correction signal U can be, for example, an algorithm used by an integral compensator, as shown in formulas 11 and 12:

$$dc[i+1]=dc[i]-U[i] \quad (11)$$

where i is a number of sampling events.

$$U[i]=T*dc[i]+U[i-1] \quad (12)$$

where T and i are a constant and the number of sampling events, respectively.

Formula 12 is applied to Z transform which is represented by formula 13:

$$U(z)=T/(1+T-z^\wedge-1) \quad (13)$$

To estimate the DC offset (dc) value accurately using formula 10, an amplitude A of the track zero crossing signal TZCA and the ratio M have to be measured and a sine function needs to be calculated. An additional analog-to-digital (A/D) converter is required for a measurement of amplitude A, and a lookup table is used. If a lookup table is not used, a large amount of calculations are required for a calculation of the sine function.

To reduce a considerable amount of calculation, control rules represented by formulas 14 and 15 are used instead of formulas 11 and 12.

$$M[i+1]=M[i]-U[i] \quad (14)$$

$$U[i]=T*+M[i]+U[i-1] \quad (15)$$

where T is a constant.

In other words, if the digital correction signal U is calculated using formulas 14 and 15, the sine function does not need to be calculated and the amplitude A of the track zero crossing signal TZCA does not need to be measured. Here, a gain T is set to an appropriate value by simulation.

Figure 5A:
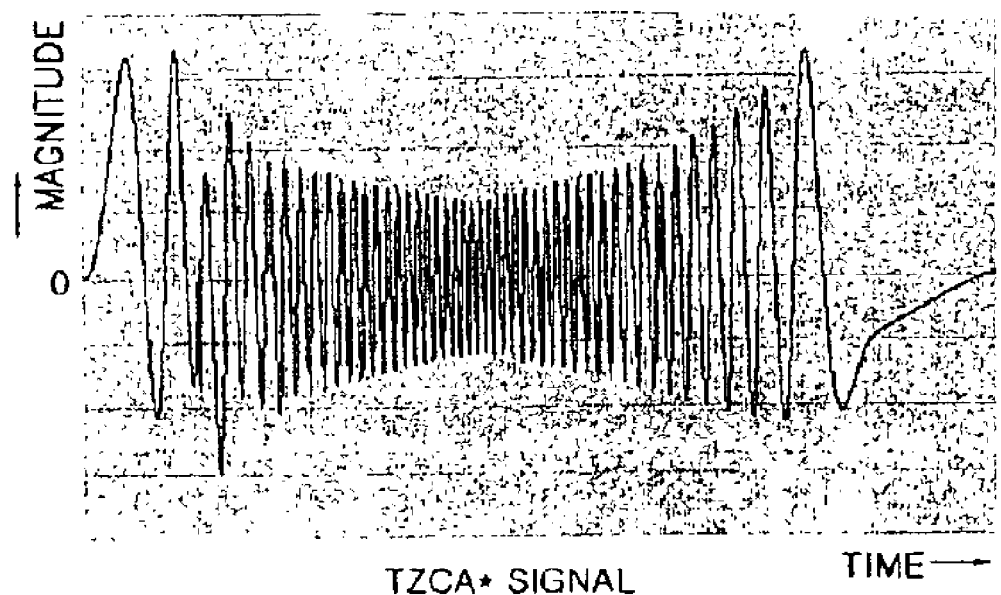
FIG. 5A is a view of a waveform of a tracking error signal input to an adder of FIG. 2 before correction of an offset and unbalance.
Figure 5B:
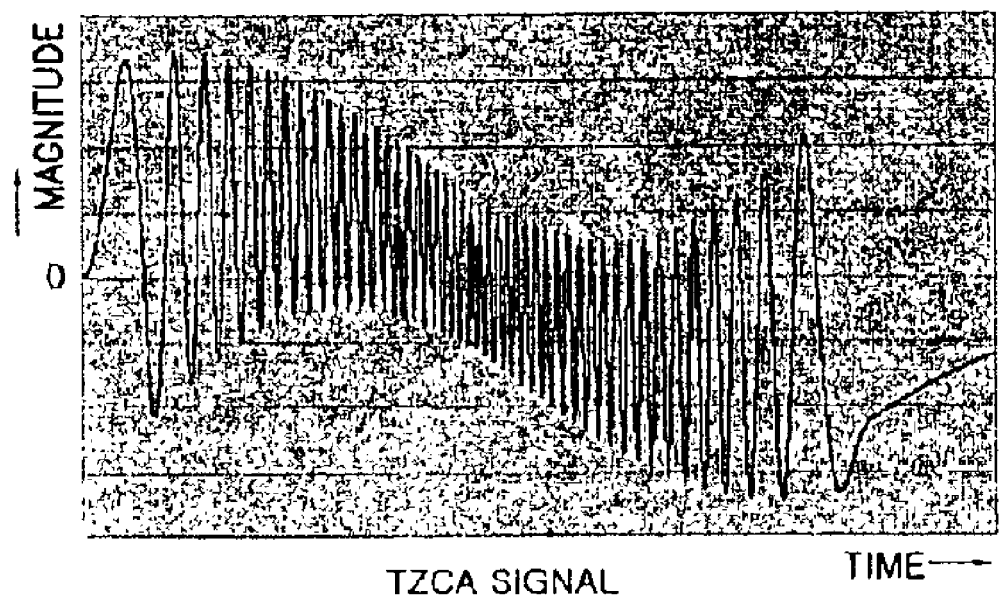
FIG. 5B is a view of a waveform of a tracking error signal output from the adder of FIG. 2 after correction of the offset and the unbalance.
Figure 5C:
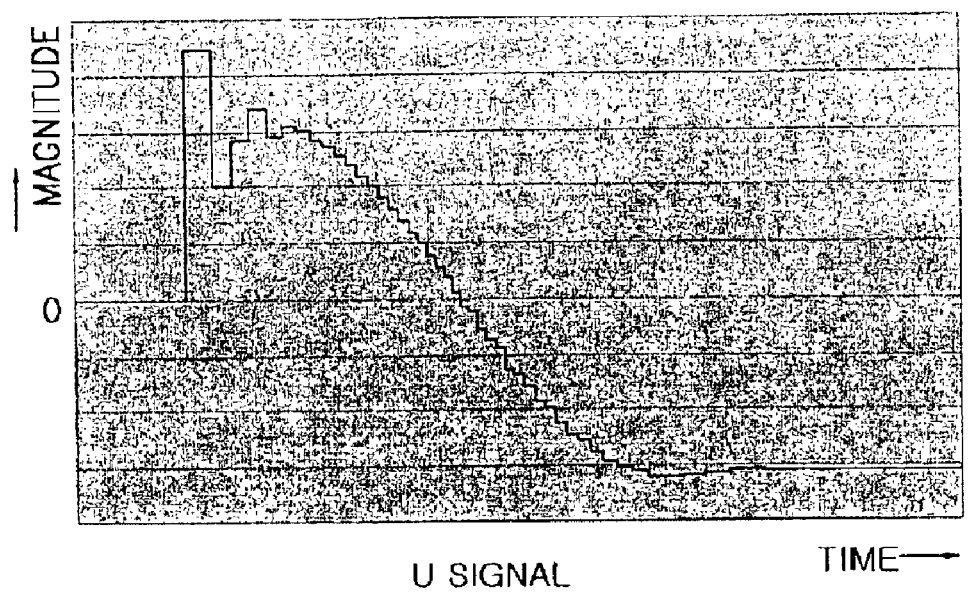
FIG. 5C is a view of a waveform of a correction signal U.

The digital correction signal U obtained from such an algorithm is converted into an analog correction signal by the D/A converter 203 and then applied to the adder 201. As a result, the track zero crossing signal TZCA, which is offset or unbalanced as shown in FIG. 5A, is corrected in the adder 201 by the analog correction signal U output from the D/A converter 203, as shown in FIG. 5C, and is then output as shown in FIG. 5B. Thus, the offset of the track zero crossing signal TZC output from the comparator 202 can be adaptively corrected even when the tracking error signal TZCA is offset and unbalanced due to noise and the like occurring in the system. Also, if necessary, the track zero crossing signal TZC may be used as a signal to remove noise of the track zero crossing signal TZC using the noise removal filter 207 and to obtain information on a position and speed in a seek mode.

Figure 3:
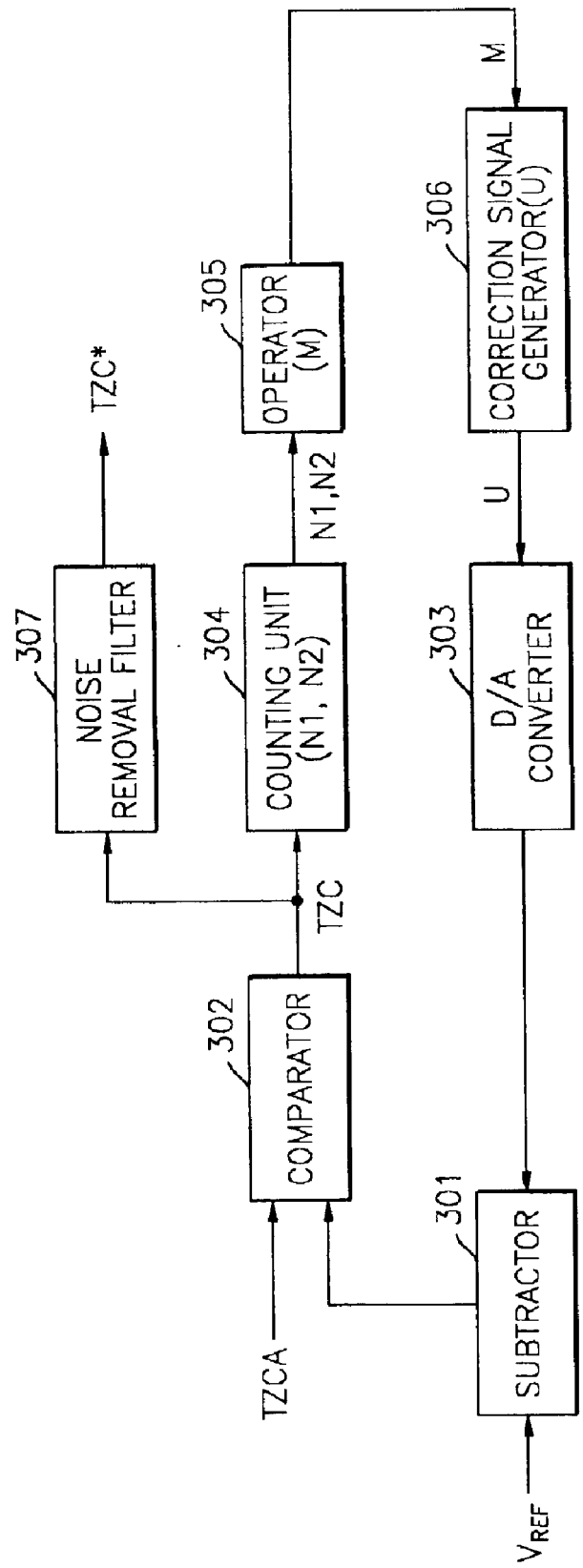
FIG. 3 is a block diagram of an apparatus to generate the adaptive track zero crossing signal according to a second embodiment of the present invention.

FIG. 3 is a configuration view of an apparatus to generate the adaptive track zero crossing signal in the disc drive according to a second embodiment of the present invention. The apparatus includes a subtractor 301, a comparator 302, a digital-to-analog (D/A) converter 303, a counting unit 304, an operator 305, a correction signal generator 306, and a noise removal filter 307.

The structures and operations of the counting unit 304, the operator 305, the correction signal generator 306, and the noise removal filter 307 shown in FIG. 3 are the same as those of the counting unit 203, the operator 205, the correction signal generator 206, and the noise removal filter 207, respectively, shown in FIG. 2. Thus, a detailed description thereof will be omitted and only the differences be described.

In the first embodiment, the correction signal U is directly added to the tracking error signal TZCA to correct the offset occurring in the tracking error signal TZCA. However, in the second embodiment, the correction signal U is subtracted from the reference voltage VREF of the comparator 302 to correct the offset of the tracking error signal TZCA. As a result, a signal output from the comparator 302 is equal to a signal output from the comparator 202.

Figure 6:
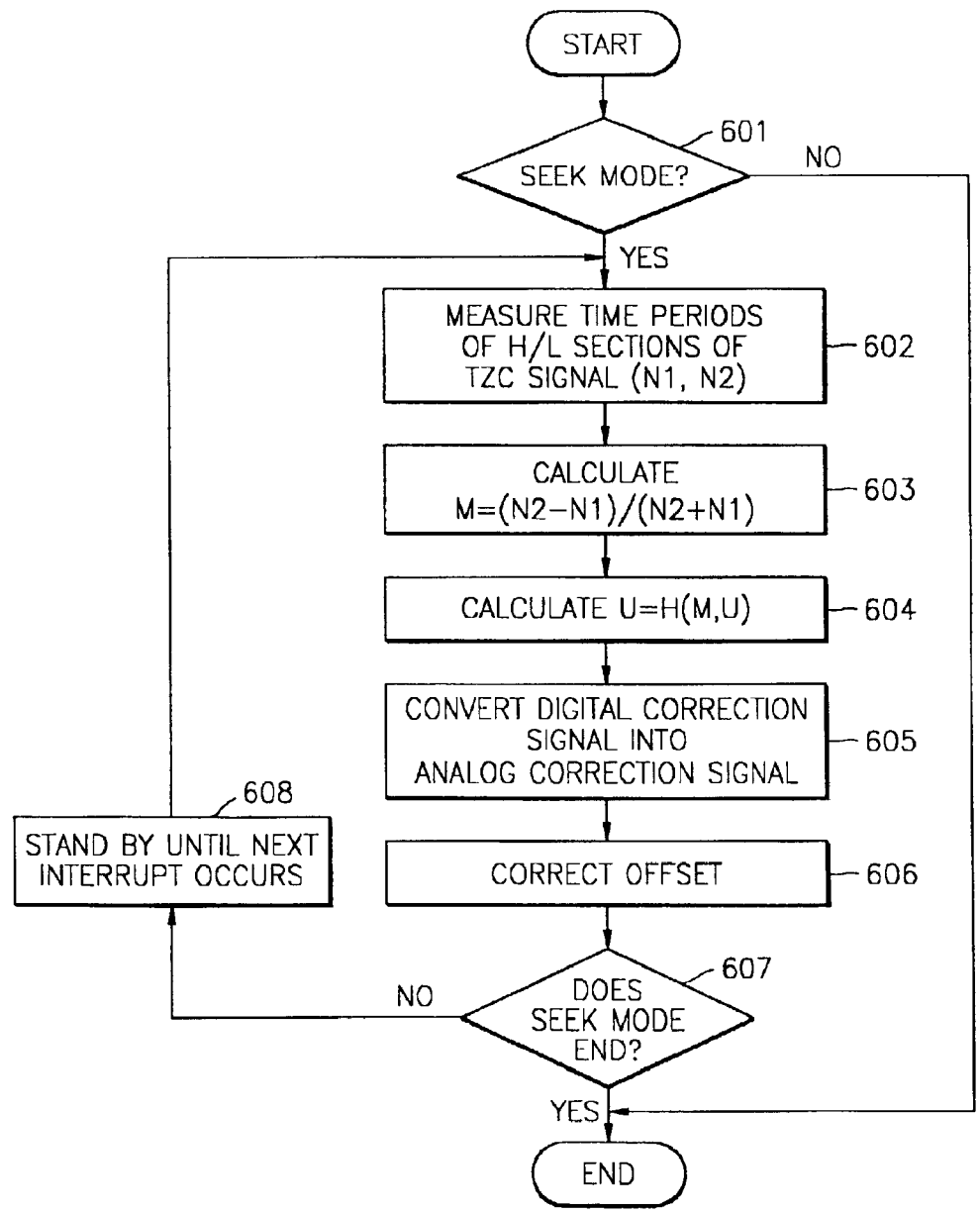
FIG. 6 is a flowchart of a method to generate the adaptive track zero crossing signal according to the present invention.

FIG. 6 is a flowchart of a method to generate the adaptive track zero crossing signal which is executed by hardware and software included in a disc drive. The correction of the offset and the unbalance of the track zero crossing signal is necessary in a seek mode and optional in other modes. At operation 601, the method determines whether or not the disc drive goes into the seek mode. If the disc drive goes into the seek mode at operation 601, at operation 602, time periods N1 and N2 of the high and low sections of the tracking error signal used to generate the track zero crossing signal are measured using counters. The method of measuring N1 and N2 is the same as that described in relation to the counting unit 204 of FIG. 2.

At operation 603, the ratio M of the differences in time periods of the high and low sections per cycle of the tracking error signal TZCA, which is changed based on the amount of offset, is calculated. That is, the ratio M is obtained using formula (N2−N1)/(N2+N1).

At operation 604, the correction signal U to correct a duty that is affected by the offset is calculated. Here, the correction signal U is obtained using algorithms having formulas 11 and 12 or control rules using formulas 14 and 15.

At operation 605, the correction signal U is converted into an analog correction signal. At operation 606, the analog correction signal is applied to a track zero crossing signal circuit to correct the offset. There are two ways to correct the offset using the correction signal U: an adder (a subtractor) adding (subtracting) the correction signal U to (from) the reference voltage of a comparator to generate the track zero crossing signal; or the adder (subtractor) directly adding (subtracting) the correction signal U to (from) the tracking error signal used to generate the track zero crossing signal. Any one of these two ways may be used.

At operation 607, the method determines whether or not the seek mode must continue. If the seek mode is ended, all steps are ended. If not, at operation 608, the algorithm stands by until next interrupt occurs. If the interrupt occurs, operations 602 through 607 are repeated. Here, a signal 2 which is generated by dividing a frequency of a track zero crossing signal having a square wave into two and delaying by N1/2 is used to generate the interrupt.

As described above, according to the present invention, a duty corrects the offset or unbalance even when the tracking error signal is offset or unbalanced in the disc drive. Thus, the track zero crossing signal can be accurately generated, and accurate information on speed and position can be obtained from the track zero crossing signal. As a result, the seek servo can be accurately controlled.

The present invention can be executed as methods, apparatuses, systems, and the like. Means constituting the present invention are code segments which carry out necessary operations. Programs or segments can be stored in a processor-readable medium or can be transmitted via a computer data signal combined with carrier waves in a transmission medium or a communication network. The processor-readable medium includes any media which can store or transmit information. For example, the processor-readable medium may include electronic circuits, semiconductor memory devices, ROMs, flash memories, E2-PROM, floppy discs, optical discs, hard discs, optical fiber media, radio frequency (RF) nets, and the like. The computer data signal includes any signals which can be transmitted over the transmission medium such as electronic net channels, optical fibers, electric fields, RF nets, and the like.

While this invention has been particularly shown and described with reference to preferred embodiments thereof, the scope of the present invention must not be interpreted as being restricted to the embodiments. It will be understood by those skilled in the art that various changes in form and details may be made therein without departing from the spirit and scope of the invention as defined by the appended claims. Therefore, it is obvious that the present invention is not restricted to shown and described specific structures and arrangements.

What is claimed is:

1. An apparatus to generate an adaptive track zero crossing signal in a disc drive, the apparatus comprising:
    an adder adding and outputting a predetermined signal to generate a track zero crossing signal and a correction signal;
    a comparator having a first input node and a second input node, receiving the predetermined signal from the adder through the first input node, receiving a reference voltage signal through the second input node, comparing the signals input into the first and second input nodes, and generating a track zero crossing signal having a square wave; and
    an offset correction calculator measuring lengths of high and low sections of the track zero crossing signal, calculating a ratio of differences in the lengths between the high and low sections, and generating a correction signal to maintain a duty ratio of the track zero crossing signal at a predetermined target value using the calculated ratio,
    wherein the offset correction calculator includes:
        a counting unit measuring time periods of the high and low sections for each cycle of the track zero crossing signal and outputting the measured time periods; and
        a operator generating a predetermined calculation signal corresponding to a difference ratio in time periods between the high and low sections using the measured time periods of the high and low sections, and
    wherein the predetermined difference ratio is calculated by the formula $$M=(N2-N1)/(N2+N1),$$

where N1 is a time period of the high section of the track zero crossing signal, and N2 is a time period of the low section of the track zero crossing signal.

2. The apparatus of claim 1, wherein the offset correction calculator includes:
    a correction signal generator receiving the calculation signal to generate a digital correction signal to reduce an amount of offset of the predetermined signal used to generate the track zero crossing signal in proportion to a strength of the calculation signal; and
    a digital-to-analog (D/A) converter converting the digital correction signal into an analog correction signal.

3. The apparatus of claim 2, wherein the counting unit latches a value counted from a rising edge of the track zero crossing signal to a falling edge to a first register, and latches to a second register a value counted from a falling edge of the track zero crossing signal to a rising edge.

4. The apparatus of claim 1, wherein the predetermined target value is the duty ratio of 50%.

5. The apparatus of claim 1, wherein the predetermined signal is a tracking error signal.

6. An apparatus to generate an adaptive track zero crossing signal in a disc drive, the apparatus comprising:
    an adder adding and outputting a predetermined signal to generate a track zero crossing signal and a correction signal;
    a comparator having a first input node and a second input node, receiving the predetermined signal from the adder through the first input node, receiving a reference voltage signal through the second input node, comparing the signals input into the first and second input nodes, and generating a track zero crossing signal having a square wave; and
    an offset correction calculator measuring lengths of high and low sections of the track zero crossing signal, calculating a ratio of differences in the lengths between the high and low sections, and generating a correction signal to maintain a duty ratio of the track zero crossing signal at a predetermined target value using the calculated ratio,
    wherein the offset correction calculator includes:
        a counting unit measuring time periods of the high and low sections for each cycle of the track zero crossing signal and outputting the measured time periods;
        a operator generating a predetermined calculation signal corresponding to a difference ratio in time periods between the high and low sections using the measured time periods of the high and low sections;
        a correction signal generator receiving the calculation signal to generate a digital correction signal to reduce an amount of offset of the predetermined signal used to ganerate the track zero crossing signal in proportion to a strength of the calculation signal; and
        a digital-to-analog (D/A) converter converting the digital correction signal into an analog correction signal, and
    wherein the digital correction signal is calculated by the formula $$dc[i+1]=dc[i]-U[i]$$
    $$U[i]=T*dc[i]+U[i-1]$$

where T is a constant, i is a number of sampling events, and dc is $A*\sin(M/2\pi)$, where A is amplitude of the predetermined signal used for the generation of the track zero crossing signal.

7. An apparatus to generate an adaptive track zero crossing signal in a disc drive, the apparatus comprising:
    an adder adding and outputting a predetermined signal to generate a track zero crossing signal and a correction signal;
    a comparator having a first input node and a second input node, receiving the predetermined signal from the adder through the first input node, receiving a reference voltage signal through the second input node, comparing the signals input into the first and second input nodes, and generating a track zero crossing signal having a square wave; and
    an offset correction calculator measuring lengths of high and low sections of the track zero crossing signal, calculating a ratio of differences in the lengths between the high and low sections, and generating a correction signal to maintain a duty ratio of the track zero crossing signal at a predetermined target value using the calculated ratio, wherein the offset correction calculator includes:
a counting unit measuring time periods of the high and low sections for each cycle of the track zero crossing signal and outputting the measured time periods;
a operator generating a predetermined calculation signal corresponding to a difference ratio in time periods between the high and low sections using the measured time periods of the high and low sections;
a correction signal generator receiving the calculation signal to ganerate a digital correction signal to reduce an amount of offset of the predetermined signal used to ganerate the track zero crossing signal in proportion to a strength of the calculation signal; and
a digital-to-analog (D/A) converter converting the digital correction signal into an analog correction signal, and
wherein the digital correction signal is calculated by the formula $$M[i+1]=M[i]-U[i]$$

$$U[i]=T*+M[i]+U[i-1]$$

where T is a constant, and M is $2/\pi*\sin-1(dc/A)$.

8. An apparatus to generate an adaptive track zero crossing signal in a disc drive, the apparatus comprising:
a subtractor subtracting a correction signal from a reference voltage signal to process and output a signal
a comparator having a first input node and a second input node, receiving a predetermined signal to generate the track zero crossing signal through the first input node, receiving the signal output from the subtractor through the second input node, comparing the signals input through the first and second input nodes, and generating the track zero crossing signal having a square wave; and
an offset correction calculator measuring lengths of high and low sections of the track zero crossing signal from the comparator, calculating a ratio of differences in the lengths between the high and low sections, and generating a correction signal to maintain a duty ratio of the track zero crossing signal at a predetermined target value using the calculated ratio,
wherein the offset correction calculator includes:
a counting unit measuring time periods of the high and low sections for each cycle of the track zero crossing signal and outputting the measured time periods; and
a operator generating a predetermined calculation signal corresponding to a difference ratio in time periods between the high and low sections using the measured time periods from the counting unit, and wherein the predetermined difference ratio is calculated by the formula $$M=(N2-N1)/(N2+N1),$$

where N1 is a time period of the high section of the track zero crossing signal, and N2 is a time period of the low section of the track zero crossing signal.

9. The apparatus of claim 8, wherein the offset correction calculator includes:
a correction signal generator receiving the calculation signal and generating a digital correction signal to reduce an amount of offset of the predetermined signal used to generate the track zero crossing signal in proportion to a strength of the calculation signal; and a digital-to-analog (D/A) converter converting the digital correction signal into an analog correction signal.

10. The apparatus of claim 9, wherein the counting unit latches a value counted from a rising edge of the track zero crossing signal to a falling edge to a first register, and latches to a second register a value of the clock signal having a predetermined frequency counted from a falling edge of the track zero crossing signal to a rising edge.

11. The apparatus of claim 8, wherein the predetermined target value is the duty ratio of 50%.

12. The apparatus of claim 8, wherein the predetermined signal is a tracking error signal.

13. An apparatus to generate an adaptive track zero crossing signal in a disc drive, the apparatus comprising:
a subtractor subtracting a correction signal from a reference voltage signal to process and output a signal
a comparator having a first input node and a second input node, receiving a predetermined signal to generate the track zero crossing signal through the first input node, receiving the signal output from the subtractor through the second input node, comparing the signals input through the first and second input nodes, and generating the track zero crossing signal having a square wave; and
an offset correction calculator measuring lengths of high and low sections of the track zero crossing signal from the comparator, calculating a ratio of differences in the lengths between the high and low sections, and generating a correction signal to maintain a duty ratio of the track zero crossing signal at a predetermined target value using the calculated ratio,
wherein the offset correction calculator includes:
a counting unit measuring time periods of the high and low sections for each cycle of the track zero crossing signal and outputting the measured time periods;
a operator generating a predetermined calculation signal corresponding to a difference ratio in time periods between the high and low sections using the measured time periods from the counting unit;
a correction signal generator receiving the calculation signal and generating a digital correction signal to reduce an amount of offset of the predetermined signal used to ganerate the track zero crossing signal in proportion to a strength of the calculation signal; and
a digital-to-analog (D/A) converter converting the digital correction signal into an analog correction signal, and
wherein the digital correction signal is calculated by the formula $$dc[i+1]=dc[i]-U[i]$$

$$U[i]=T*dc[i]+U[i-1]$$

where T is a constant, i is a number of sampling events, and dc is $A*\sin(M/2\pi)$, where A is amplitude of the predetermined signal used to generate the track zero crossing signal.

14. An apparatus to ganerate an adaptive track zero crossing signal in a disc drive, the apparatus comprising:
a subtractor subtracting a correction signal from a reference voltage signal to process and output a signal
a comparator having a first input node and a second input node, receiving a predetermined signal to generate the track zero crossing signal through the first input node, receiving the signal output from the subtractor through the second input node, comparing the signals input through the first and second input nodes, and generating the track zero crossing signal having a square wave; and an offset correction calculator measuring lengths of high and low sections of the track zero crossing signal from the comparator, calculating a ratio of differences in the lengths between the high and low sections, and generating a correction signal to maintain a duty ratio of the track zero crossing signal at a predetermined target value using the calculated ratio, wherein the offset correction calculator includes:

a counting unit measuring time periods of the high and low sections for each cycle of the track zero crossing signal and outputting the measured time periods;

a operator generating a predetermined calculation signal corresponding to a difference ratio in time periods between the high and low sections using the measured time periods from the counting unit;

a correction signal generator receiving the calculation signal and generating a digital correction signal to reduce an amount of offset of the predetermined signal used to generate the track zero crossing signal in proportion to a strength of the calculation signal; and a digital-to-analog (D/A) converter converting the digital correction signal into an analog correction signal, and wherein the digital correction signal is calculated by the formula $$M[i+1]=M[i]-U[i]$$

$$U[i]=T*+M[i]+U[i-1]$$

where T is a constant, and M is $2/\pi*\sin-1(dc/A)$.

15. A method of generating an adaptive track zero crossing signal in a disc drive, the method comprising:

measuring lengths of high and low sections in each cycle of the track zero crossing signal;

calculating a predetermined difference ratio in the lengths between the high and low sections;

generating a correction signal to maintain a duty ratio of the track zero crossing signal at a predetermined target value, using the predetermined difference ratio; and applying the correction signal to a track zero crossing signal generator to correct an offset, wherein the predetermined difference ratio is calculated by the formula $$M=(N2-N1)/(N2+N1),$$

where N1 is a time period of the high section of the track zero crossing signal, and N2 is a time period of the low section of the track zero crossing signal.

16. The method of claim 15, wherein the predetermined target value is the duty ratio of 50%.

17. The method of claim 15, wherein the measuring of the lengths of the high and low sections latches to a first register value counted from a rising edge of the track zero crossing signal to a falling edge, and latches to a second register a value counted from a falling edge of the track zero crossing signal to a rising edge.

18. A method of generating an adaptive track zero crossing signal in a disc drive, the method comprising:

measuring lengths of high and low sections in each cycle of the track zero crossing signal;

calculating a predetermined difference ratio in the lengths between the high and low sections;

generating a correction signal to maintain a duty ratio of the track zero crossing signal at a predetermined target value, using the predetermined difference ratio; and applying the correction signal to a track zero crossing signal generator to correct an offset, wherein the correction signal is calculated by the formula below:

$$dc[i+1]=dc[i]-U[i]$$

$$U[i]=T*dc[i]+U[i-1],$$

where T is a constant, i is a number of sampling events, and dc is $A*\sin(M/2\pi)$, where A is amplitude of the predetermined signal used to generate the track zero crossing signal.

19. A method of generating an adaptive track zero crossing signal in a disc drive, the method comprising:

measuring lengths of high and low sections in each cycle of the track zero crossing signal;

calculating a predetermined difference ratio in the lengths between the high and low sections;

generating a correction signal to maintain a duty ratio of the track zero crossing signal at a predetermined target value, using the predetermined difference ratio; and applying the correction signal to a track zero crossing signal generator to correct an offset, wherein the correction signal is calculated by the formula below:

$$M[i+1]=M[i]-U[i]$$

$$U[i]=T*+M[i]+U[i-1].$$

where T is a constant, and i is a number of sampling events.

* * * * *

UNITED STATES PATENT AND TRADEMARK OFFICE
CERTIFICATE OF CORRECTION

PATENT NO. : 6,934,110 B2
DATED : August 23, 2005
INVENTOR(S) : Hyeong-deok Yoon It is certified that error appears in the above-identified patent and that said Letters Patent is hereby corrected as shown below:

Column 8,
Line 33, change "ganerate" to -- generate --.

Column 9,
Lines 10 and 12, change "ganerate" to -- generate --.

Column 10,
Lines 43 and 59, change "ganerate" to -- generate --.

Column 12,
Line 51, change "." to -- , --.

Signed and Sealed this

Sixth Day of December, 2005

JON W. DUDAS
*Director of the United States Patent and Trademark Office*